June 19, 1928.
J. J. CARTER
1,673,800
MANUFACTURE OF COMMUTATOR CLAMPING RINGS
Filed Sept. 26, 1924
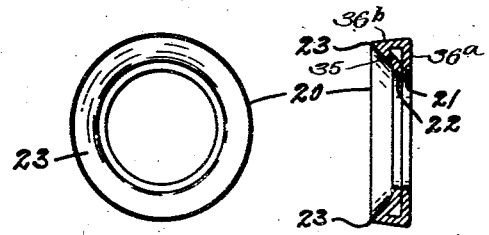
Fig. 1   Fig. 2
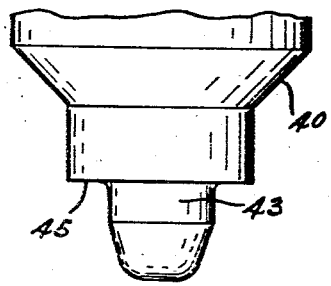
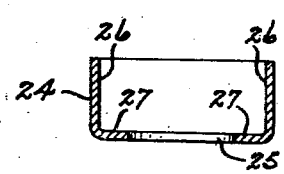
Fig. 3
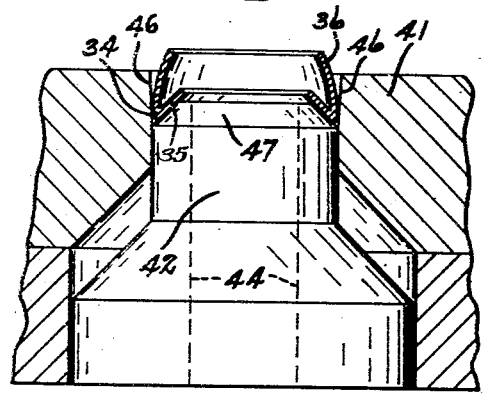
Fig. 6
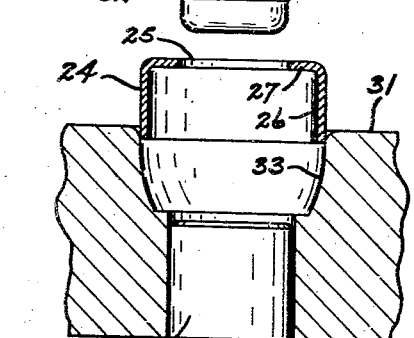
Fig. 4
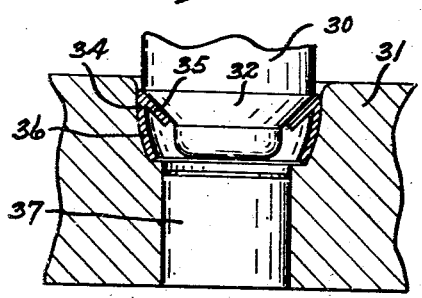
Fig. 5
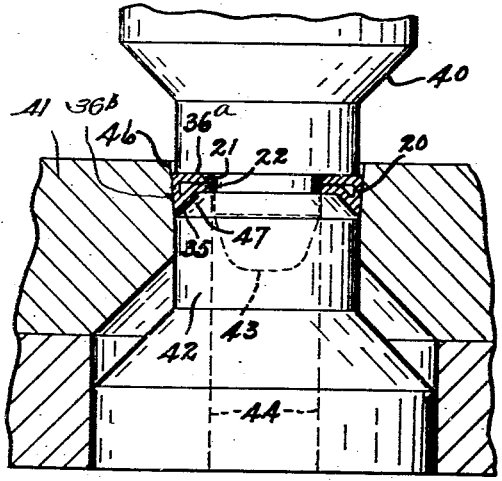
Fig. 7
Inventor
John J. Carter.
By Spencer, Small and Hardman,
his Attorneys.

Patented June 19, 1928.

1,673,800

UNITED STATES PATENT OFFICE.

JOHN J. CARTER, OF ANDERSON, INDIANA, ASSIGNOR, BY MESNE ASSIGNMENTS, TO DELCO-REMY CORPORATION, OF DAYTON, OHIO, A CORPORATION OF DELAWARE.

MANUFACTURE OF COMMUTATOR CLAMPING RINGS.

Application filed September 26, 1924. Serial No. 740,079.

This invention relates to the manufacture of clamping rings for the commutators of dynamo-electric machines and includes among its objects the manufacture of commutator clamping rings from sheet metal.

Further objects and advantages of the present invention will be apparent from the following description, reference being had to the accompanying drawings, wherein a preferred embodiment of one form of the present invention is clearly shown.

In the drawings:

Fig. 1 is a face view of a clamping ring constructed in accordance with the present invention;

Fig. 2 is a cross sectional view thereof;

Fig. 3 is a cross sectional view of a cup-shaped member formed of flat sheet material, indicating the first step in the process of manufacture;

Fig. 4 shows the cup in Fig. 3 inverted for operation upon by punch and die members, the die member being shown in section in Fig. 4;

Fig. 5 is a view similar to Fig. 4 showing a further step in the process after the punch and die members shown in Fig. 4 have completed their work;

Fig. 6 shows the work in position for operation thereupon by a second set of punch and die members, one of the die members being shown in section; and Fig. 7 is a view similar to Fig. 6 showing the completed commutator ring in section after the punch and die members shown in Fig. 6 have completed their work.

The clamping ring which is a product of the process to be described is shown more particularly in Figs. 1 and 2 where it is designated by numeral 20. The ring 20 comprises an annulus of sheet metal which has been folded to provide three flanges, namely, a conical flange 35, a plane flange 36ª and a conical flange 36ᵇ. The flange 36ᵇ unites the flanges 35 and 36ª and defines the outer periphery of the ring. The flanges 35 and 36ª abut adjacent their inner edges to define the inner periphery of the ring. As indicated at 21 and 22, the ring is double thickness adjacent the inner periphery in order to increase the rigidity and strength of the ring. The flanges 35 and 36ᵇ provide an annular wedge-shaped portion 23 adjacent the outer periphery of the ring which constitutes the clamping or wedging portion of the ring which cooperates with the dovetailed portions of the commutator segments in a manner well known to those skilled in the art.

The first step in the manufacture of the ring shown in Figs. 1 and 2 consists in drawing from flat sheet metal a cup-shaped member 24 and piercing a hole 25 in the bottom of the cup. Consequently there is provided an L-shaped annulus having annular flanges 26 and 27 located substantially at right angles, flange 26 being wider than flange 27. The cup 24 is inverted between cooperating punch and die members 30 and 31, the former having a conical working surface 32 and the latter having a substantially spherical recess or die portion 33. The punch 30 approaches the die 31 to force the cup 24 into the recess 33 and consequently to form the ring 24 into an annulus 34 which is substantially V-shaped in cross section. The flange 27 of the piece 24 now forms the flange 35 of the piece 34, this flange being conical in contour. The flange 26 of the piece 24 now provides the flange 36 of the piece 34, the flange 36 being substantially spherical in contour. The flanges 35 and 36 now make an acute angle with each other. To facilitate removal of the piece 34 from the die there is provided a stripper 37 of sufficient size to engage the flange 35 and force the piece 34 out of the die 31.

The next step in the process is to locate the work piece 34 between punch and die members 40 and 41 and a plunger or stripper member 42 which constitutes a portion of the die 41. The punch 40 includes a pilot member 43 adapted to be received by central hole 44 in the stripper member 42. Punch 40 includes a plane working surface 45 for engaging the flange 36 of the work piece 34. The die member 41 includes a substantially conical die surface 46 and the stripper 42 provides a conical die surface 47 which supports the flange 35. As the punch 40 approaches the die members 41 and 42, the flange 36 is formed into two flanges 36ª and 36ᵇ. The flange 36ᵇ conforms to the conical surface 46 of the die 41, and the flange 36ᵃ conforms to the plane surface 45 of the punch 40. The flanges 35 and 36ᵃ are caused to abut adjacent their inner edges; and the abutting portions, designated by reference numbers 21 and 22, are squeezed between the stripper 42 and the punch 40 to define the inner periphery of the ring which then has a thickness of twice the thickness of the sheet metal piece from which the ring was formed. The operation shown in Fig. 7 therefore forms the work piece 34 into a clamping ring having a plane face on one side thereof, and on the opposite side an annular flange 23 which is wedge-shaped in cross section.

It is apparent from the foregoing description of the manufacture of commutator clamping rings that the cost of manufacture has been greatly reduced. This is due to the great saving of time and material as compared with the material and labor costs involved in the manufacturing of commutator clamping rings by a lathe from a solid bar of stock.

While the form of embodiment of the invention as herein disclosed, constitutes a preferred form, it is to be understood that other forms might be adopted, all coming within the scope of the claims which follow.

What I claim is as follows:

1. The method of forming a commutator clamping ring of triangular cross-section which consists in forming from sheet metal an annulus comprising two flanges making an acute angle, one of the flanges being wider than the other, and the narrower flange being conical; and in bending the wider flange while supporting said conical flange so as to form from the wider flange, two flanges, one of which abuts said conical flange adjacent its free edge, and the other of which is intermediate the abutting flanges.

2. The method of forming a commutator clamping ring of triangular cross-section which consists in forming from sheet metal an annulus comprising two flanges making an acute angle, one of the flanges being wider than the other, and the narrower flange being conical; and in bending the wider flange while supporting said conical flange so as to form from the wider flange two flanges, one of which is plane and abuts said conical flange adjacent its free edge, and the other of which is intermediate the abutting flanges.

3. The method of forming a commutator clamping ring of triangular cross-section which consists in forming from sheet metal an annulus comprising two flanges making an acute angle, one of the flanges being wider than the other, and the narrower flange being conical; and in bending the wider flange while supporting said conical flange so as to form from the wider flange two flanges, one of which is plane and abuts said conical flange adjacent its free edge, and the other of which is a conical flange intermediate the first mentioned conical flange and the plane flange.

4. The method of forming a commutator clamping ring of triangular cross-section which consists in forming from sheet metal an annulus comprising two flanges which flare from their junction inwardly toward the axis of the annulus, one of the flanges being wider than the other; and in bending the wider flange while supporting the narrower flange so as to form from the wider flange two flanges, one of which engages the narrower flange adjacent its free edge, and the other of which is intermediate the abutting flanges.

5. The method of forming a commutator clamping ring of triangular cross-section which consists in forming from sheet metal an annulus comprising two flanges which flare from their junction inwardly toward the axis of the annulus, one of the flanges being wider than the other; and in bending the wider flange while supporting the narrower flange so as to form from the wider flange two flanges, one of which is plane and engages the narrower flange adjacent its free edge, and the other of which is intermediate the abutting flanges.

6. The method of forming a commutator clamping ring of triangular cross-section which consists in forming from sheet metal an annulus comprising two flanges which flare from their junction inwardly toward the axis of the annulus, one of the flanges being wider than the other; and in bending the wider flange while supporting the narrower flange so as to form from the wider flange two flanges, one of which is plane and engages the narrower flange adjacent its free edge, and the other flange of which is conical and is intermediate the narrower flange and the plane flange.

7. A commutator clamping ring comprising an annulus of folded sheet metal forming a double thickness of the metal adjacent the inner periphery of the ring and an annular portion wedge-shaped in cross-section adjacent the outer periphery.

8. A commutator clamping ring of substantially triangular cross-section comprising three sheet metal flanges, two of which abut adjacent the inner periphery of the annulus and the other forming the outer periphery of the annulus and uniting the first mentioned flanges.

9. A commutator clamping ring of substantially triangular cross-section comprising three sheet metal flanges, two of which abut adjacent the inner periphery of the annulus, one being angular and the other plane, and a third flange providing the outer periphery of the ring and joining the other flanges.

10. A commutator clamping ring of substantially triangular cross-section comprising three sheet metal flanges, a plane flange defining the outer periphery of the ring, a plane flange and an angular flange joined by the first flange and abutting adjacent their inner edges to define the inner periphery of the ring.

In testimony whereof I hereto affix my signature.

JOHN J. CARTER.